United States Patent
Amirpour et al.

(10) Patent No.: US 9,140,626 B2
(45) Date of Patent: Sep. 22, 2015

(54) MOTOR VEHICLE TEST DEVICE AND MOTOR VEHICLE TEST METHOD

(75) Inventors: Ramon Amirpour, Ebersbach (DE); Guenter Nobis, Nuertingen (DE); Roger Malmsheimer, Allmersbach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 122 days.

(21) Appl. No.: 13/821,871

(22) PCT Filed: Jul. 20, 2011

(86) PCT No.: PCT/EP2011/062445
§ 371 (c)(1),
(2), (4) Date: May 17, 2013

(87) PCT Pub. No.: WO2012/031814
PCT Pub. Date: Mar. 15, 2012

(65) Prior Publication Data
US 2013/0226394 A1   Aug. 29, 2013

(30) Foreign Application Priority Data

Sep. 10, 2010  (DE) .......................... 10 2010 040 549

(51) Int. Cl.
*G01M 17/007*   (2006.01)
*G01M 17/06*   (2006.01)

(52) U.S. Cl.
CPC ............ *G01M 17/007* (2013.01); *G01M 17/06* (2013.01)

(58) Field of Classification Search
CPC ............................ G01M 17/007; G01M 17/06

USPC ......................................................... 701/31.4
See application file for complete search history.

(56) References Cited

U.S. PATENT DOCUMENTS

| | | | |
|---|---|---|---|
| 5,646,845 A * | 7/1997 | Gudat et al. ..................... 701/41 |
| 6,181,992 B1 * | 1/2001 | Gurne et al. ................. 701/31.4 |
| 6,782,313 B1 | 8/2004 | Frech et al. |
| 7,225,060 B2 * | 5/2007 | O'Connor et al. ................ 701/1 |
| 7,509,194 B2 * | 3/2009 | Wheals et al. .................. 701/36 |
| 2004/0054451 A1 * | 3/2004 | Murray et al. .................. 701/29 |
| 2004/0125780 A1 * | 7/2004 | Klausner et al. .............. 370/338 |

(Continued)

FOREIGN PATENT DOCUMENTS

| | | |
|---|---|---|
| CN | 1352742 | 6/2002 |
| DE | 10 2008 021 512 | 12/2008 |

(Continued)

OTHER PUBLICATIONS

International Search Report, International Application No. PCT/EP2011/062445, dated Oct. 7, 2011.

*Primary Examiner* — Mary Cheung
*Assistant Examiner* — Atul Trivedi
(74) *Attorney, Agent, or Firm* — Kenyon & Kenyon LLP

(57) ABSTRACT

A motor vehicle test device and a motor vehicle test method are described. The motor vehicle test device includes a control unit for controlling a predefined test sequence; an operator interface device; and at least one measuring device for measuring at least one vehicle parameter. The motor vehicle test device has a vehicle communication interface and diagnosis software. The control device is developed in such a way that it is able to communicate with at least one control unit of the motor vehicle via the vehicle communication interface.

13 Claims, 3 Drawing Sheets

(56) References Cited

U.S. PATENT DOCUMENTS

| | | | |
|---|---|---|---|
| 2004/0145496 A1* | 7/2004 | Ellis | 340/905 |
| 2006/0149434 A1* | 7/2006 | Bertosa et al. | 701/29 |
| 2007/0260372 A1* | 11/2007 | Langer | 701/29 |
| 2007/0260373 A1* | 11/2007 | Langer et al. | 701/29 |
| 2009/0024272 A1* | 1/2009 | Rogers et al. | 701/33 |
| 2009/0043442 A1* | 2/2009 | Zopf | 701/29 |
| 2009/0112392 A1* | 4/2009 | Buur et al. | 701/29 |
| 2009/0157248 A1* | 6/2009 | Gilbert | 701/29 |
| 2010/0152957 A1* | 6/2010 | Niemz | 701/29 |
| 2010/0328060 A1* | 12/2010 | Chen et al. | 340/462 |
| 2011/0178671 A1* | 7/2011 | Bae et al. | 701/29 |
| 2011/0221867 A1 | 9/2011 | Nobis et al. | |
| 2014/0052329 A1* | 2/2014 | Amirpour et al. | 701/29.6 |
| 2014/0074344 A1* | 3/2014 | Amirpour et al. | 701/29.6 |

FOREIGN PATENT DOCUMENTS

| | | |
|---|---|---|
| DE | 10 2008 042 024 | 3/2010 |
| EP | 0 754 940 | 1/1997 |
| EP | 1 069 422 | 1/2001 |
| EP | 1 181 521 | 2/2002 |

\* cited by examiner

MOTOR VEHICLE TEST DEVICE AND MOTOR VEHICLE TEST METHOD

FIELD

The present invention relates to a motor vehicle test device and to a motor vehicle test method.

BACKGROUND INFORMATION

A modular wireless diagnosis, testing and information system for a motor vehicle is described in European Patent No. EP 0 754 940 B1.

European Patent No. EP 1 181 521 B1 describes a diagnostic test device for motor vehicles having programmable control units.

German Patent Application No. DE 10 2008 042 024 A1 describes an optical axle-measuring device for motor vehicles.

The technical advances in automotive testing technology have produced a multitude of specific test devices for individual vehicle domains. Measuring, control and regulation technologies adapted to the particular domain, which constitute the core of the specific test devices, have been developed in this context. Pertinent examples are brake test stations, engine testers, chassis-measuring test devices, exhaust-gas testers, test lanes and climate control service devices.

Currently, most functions in the vehicle are assumed by electronic control units, either in part or completely. In addition, the control units in the vehicle also assume various onboard diagnostic functions of the vehicle systems in order to subsequently make the diagnostic functions available to the service facility.

To allow an effective utilization of these control-unit diagnostic functions in the service facility, more and more universal diagnostic testers, which span vehicle domains and allow a communication with the control units installed inside the vehicle, have been developed over the past few years.

The functionality of this communication may differ considerably; for example, it may relate to the readout of stored error codes, the transmission of actual values, the implementation of complex actuator tests, the resetting of service intervals, the calibration of vehicle sensors and the training of spare parts that have been installed.

Integrated in such universal diagnostic testers is a module which provides the vehicle communication function, commonly referred to as VCI (vehicle communication interface).

However, there are also examples in which the VCI is installed in a separate housing (VCI module) and connected to a universal operating and display device such as a laptop, via cable or in wireless manner. The function of the universal diagnostic tester is then ensured by corresponding diagnostic software on the laptop, which, as a minimum, encompasses an operating device and a display, a diagnosis sequence control as well as the required communication with the control units in the vehicle via the connected VCI module.

The developments in the vehicle manufacture increasingly require the shared utilization of a universal diagnostic tester and of different test devices at the individual work station in the service facilities.

One pertinent example is the chassis measuring device, with whose aid the zero point position of the steering angle sensor is recalibrated after the adjustment of the vehicle geometry has been concluded. Another example is the climate control service device, where the focus is on checking for errors possibly stored in the climate control unit, in order to be able to provide comprehensive servicing of the climate control system. A still further example is the engine tester, in which case actual values of control units are acquired in parallel in order to supply the expert with comprehensive information for the error diagnosis.

Two separate devices are thus used in all of these examples, i.e., the universal diagnostic tester and the individual testing device, which are utilized sequentially, one after the other.

To improve the handling of such duplex systems, engine test devices also adopt approaches in which the results of the engine tests and the results of the control unit communication are displayed on two adjacently situated monitors.

The use of a universal diagnostic tester in conjunction with a separate additional specific test device requires skilled personnel experienced in the use of the diverse diagnosis functionality spanning vehicle domains. It may therefore be necessary to use two technicians for one vehicle simultaneously, which, however, is inefficient and increases costs. The separate operation of a test device and a diagnostic tester may cause manual errors in the data input into the individual devices. The test sequences of the two devices are not linked, so that only manual monitoring is possible, which may cause operator errors, e.g., a faulty adjustment of vehicle sensors.

Using the example of the steering angle sensor, for instance, the calibration of the ESP control unit via the diagnostic tester may be carried out incorrectly if a technician accidentally moves the steering wheel of the vehicle after the chassis adjustment has been concluded and before the sensor calibration by the diagnostic tester has been completed.

SUMMARY

In accordance with the present invention, the functionality of the control unit communication is integrated into a specific automotive testing device of a service facility. For this purpose a vehicle communication interface is integrated into the test device and connected to a higher-level control unit via an internal interface.

A vehicle test device according to an example embodiment of the present invention includes a measuring device for measuring at least one vehicle parameter, which measuring device either is integrated into the device or is physically separate from the device and connected to it via cable or in wireless manner.

The control unit preferably includes a control computer, an operator interface device, e.g., an input device and a display device, as well as expanded specific test-device software, which primarily may be used to realize the specific testing tasks on the vehicle; additionally, it may be utilized for remotely accessing the functions of the control unit communication (e.g., diagnostic functions, actual values, calibration functions) required in connection with these testing tasks or testing sequences in an integrated test sequence.

In an advantageous manner, the test device software is able to remotely control the software for the control unit communication, which is provided in addition to the test device software. Furthermore, the motor vehicle test device according to the present invention preferably has a shared housing or a shared mobile cart as well as the required equipment for an adaptation to the vehicle.

As before, the operator advantageously has to operate only one test device, and the communication with the control units in the vehicle takes place within a test sequence software which has been supplemented by the required control-unit communication functionality and thus runs largely in the background for the operator.

A further special advantage of this approach is the option of automatically controlling subprocesses and additionally, the entire testing process in order to thereby avoid faulty operations, such as a faulty adjustment of vehicle sensors, for instance, as a matter of principle.

BRIEF DESCRIPTION OF THE DRAWINGS

Additional features and advantages of the present invention are explained in greater detail below, on the basis of specific example embodiments and with reference to the figures.

DETAILED DESCRIPTION OF EXAMPLE EMBODIMENTS

Figure 1:
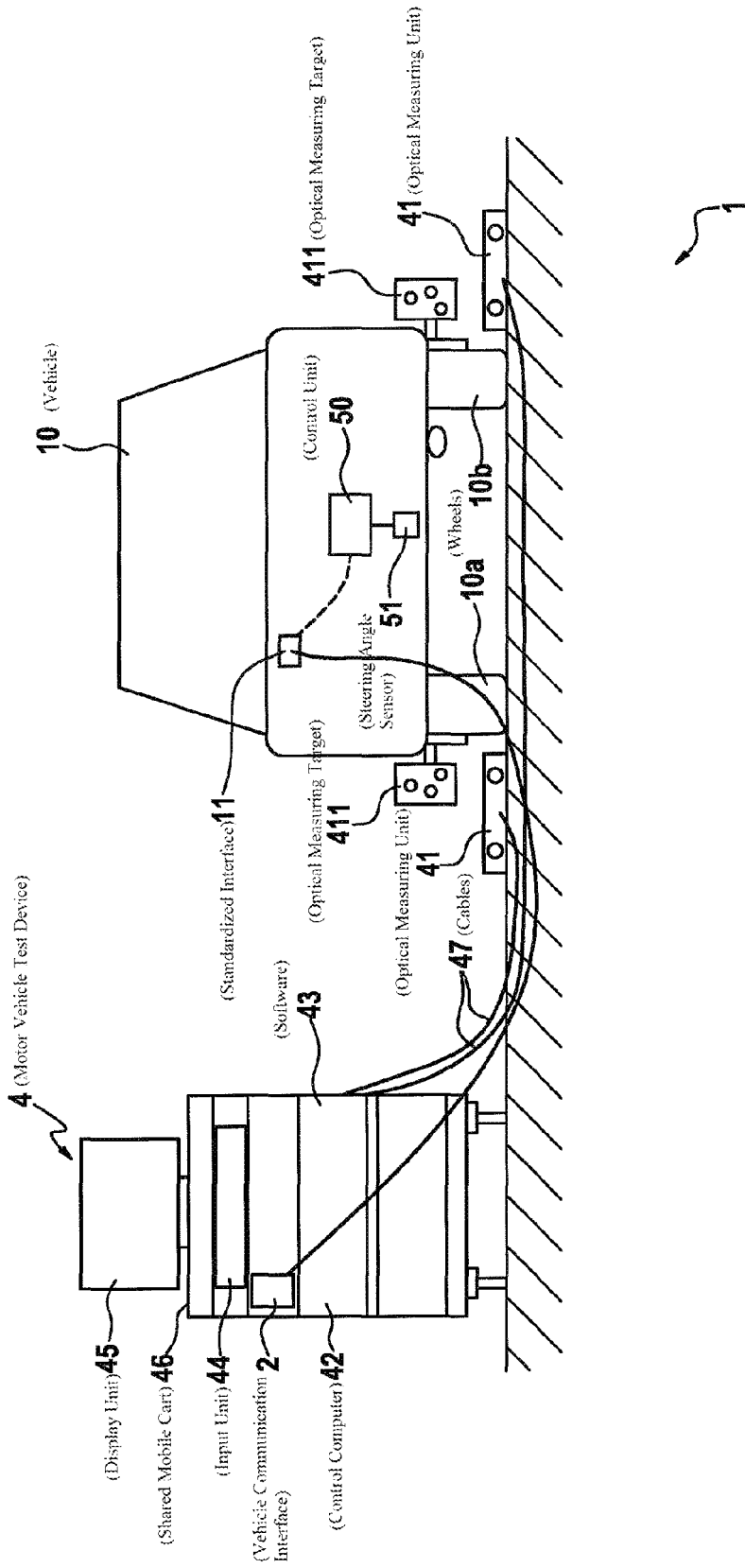
FIG. 1 shows a block diagram of a motor vehicle test device according to a first specific embodiment of the present invention.

In the figures, identical reference numerals identify the same components or components having an identical function.

FIG. 1 shows a block diagram of a motor vehicle test device according to a first specific embodiment of the present invention.

Reference numeral 1 in FIG. 1 denotes a workstation, on which a motor vehicle 10 has been placed, in order to carry out a chassis measurement. Wheels 10a, 10b of motor vehicle 10 (only two of the four wheels are shown here) are provided with optical measuring targets 411, which interact with optical measuring units 41 in order to determine the typical measuring variables of a chassis measurement such as wheel toe and camber angle, which the operator is able to adjust manually within predefined limit values, if appropriate. In the process, the wheel toe of the front wheels, for instance, is set to 0° 10', for example.

Reference numeral 4 denotes a motor vehicle test device for carrying out the chassis measurement, to which measuring units 41 are connected via cables 47. Motor vehicle test device 4 has a shared housing or a shared mobile cart 46, which accommodates a control computer 42 as well as software 43 for controlling the chassis measurement processes and for the control unit communication, an input unit 44 and a display unit 45 as well as a vehicle communication interface 2. Via a cable, vehicle communication interface 2 is internally connected to control computer 42; via an additional cable, it is furthermore connected to a standardized interface 11 inside vehicle 10, such as a conventional OBD jack. Although illustrated as a cable connection in this case, the first connection may naturally also be a wireless connection. In such a case, vehicle communication interface 2 would be situated inside vehicle 10, be connected to OBD jack via a short cable in addition, and then communicate with control computer 42 in wireless manner.

The information in connection with the chassis measurement performed by measuring units 41, and the information of vehicle communication interface 2 is simultaneously made available to control software 43 for controlling the chassis measurement processes or the chassis adjustment processes, for further processing there, as will be explained in the following text.

In the specific embodiment at hand, a technician in particular adjusts the steering angle, aligns the wheels and, if necessary, the wheel toe, until the specified standard values are obtained, which is recorded by measuring units 41 and processed by control software 43. As soon as measuring units 41 have detected the standard condition for steering angle and wheel toe, e.g., 0° 10', it is provided in the processing that control software 43, via vehicle communication interface 2, determines the difference between the steering angle currently measured by control device 50 with the aid of steering angle sensor 41, and the reference measured value for "steering angle zero" stored in control unit 50, and that it ascertains that the difference does not exceed a specified limit value. If the determined difference does exceed the limit value, control unit 50 of motor vehicle 10, e.g., an ESP control unit, indicates a calibration readiness to the operator on display device 45. If the opposite is detected, i.e., that the determined difference does not exceed the limit value, the correct status is signaled to the operator.

Once the calibration readiness has been established and indicated, the operator is able to start a calibration procedure for steering angle sensor 51 in control unit 50 via simple input at input unit 44. This calibration procedure is completed only if measuring units 41 continue to signal the standard state for steering angle and wheel toe. If a deviation from the standard state occurs, an immediate termination of the calibration procedure will result. In this way an incorrect calibration of steering angle sensor 51 is definitely able to be prevented.

In another specific embodiment, a manual start of the calibration process is dispensed with; instead, the process is started automatically and monitored in the described manner once the conditions for the calibration readiness have been satisfied. The result of the successful calibration or the determined proper state is indicated to the operator, for instance on display unit 45.

The discussed vehicle test device 4 allows a broader identification of the vehicle inasmuch as not only the information pertaining to the vehicle and relevant in the context of a chassis measurement is recorded, but also the information required to set up the intended control unit communication.

The transmission of additional information from the particular control unit 50 of vehicle 10 to test device software 43, such as error reports and/or actual values, and the display of this information in a unified manner on a single display device 45 are possible without any difficulty.

The communication between control computer 42 and control unit 50, as well as the function for the automatic calibration of the steering angle sensor may already be active before the manual start of the calibration; it includes:

Establishing and maintaining the communication between control computer 42 and control unit 50 of vehicle 10 via vehicle communication interface 2;

Storing the measured values of the chassis measuring system (as a minimum, the wheel toe of the front wheels) in the "steering wheel position straight ahead" state, which state is already brought about by the operator in the chassis measurement sequence heretofore, while the chassis measurement procedure is taking place or at the end of the chassis adjustment in control computer 42;

Permanently monitoring these stored measured values after the actual chassis measurement has been concluded in control computer 42;

Transmitting the information "steering wheel position straight ahead" or "steering angle zero" to control unit 50 in vehicle 10, checking the difference between the steering angle measured in this state by control device 50 with the aid of steering angle sensor 41, and the reference measured value stored in control unit 50 for the "steering angle zero" state, and if a specified limit value is exceeded, permanently storing the measured value currently recorded by steering angle sensor 41 as new reference value for "steering angle zero".

Monitoring the measured values of the axle measurement system (the wheel toe of the front wheels as a minimum) by control computer 42 during the entire calibration procedure, the system reporting a "successful completion" of the calibration process only if these measured values agree with the previously stored measured values at "steering wheel position straight ahead" within the tolerance limits stored in the system.

In one alternative variant, the status "steering wheel position straight ahead" is checked not only manually, but also recorded by control computer 42 during the chassis adjustment process with the aid of a suitable sensor system, and monitored by control computer 42 during the calibration process, either instead of the measured values of the chassis measurement, or additionally thereto.

The work quality and efficiency in the service facility are therefore improved simultaneously.

Figure 2:
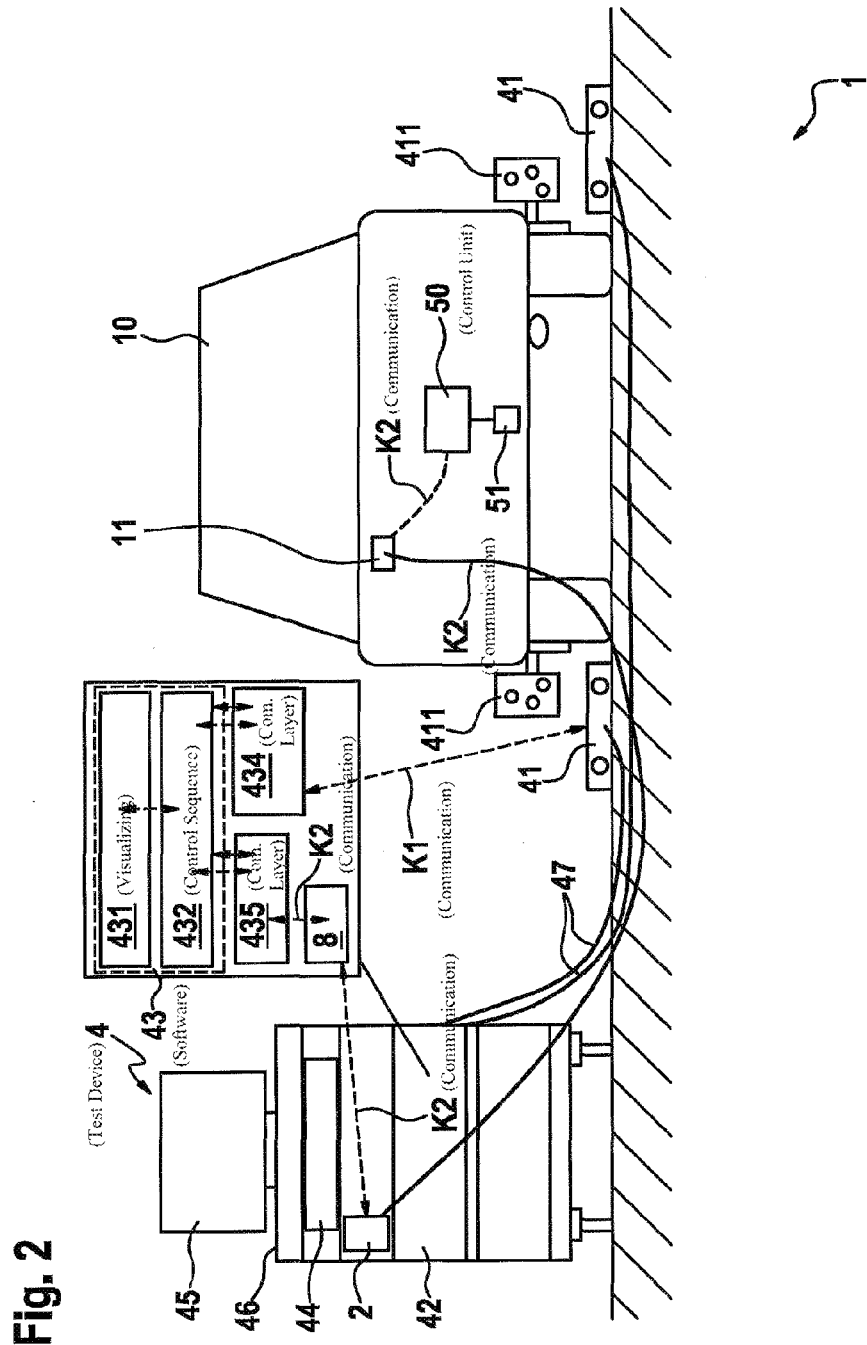
FIG. 2 shows a more detailed block diagram of a motor vehicle test device according to the first specific embodiment of the present invention.

FIG. 2 shows a block diagram of a motor vehicle test device according to the first specific embodiment of the present invention.

FIG. 2 in particular shows a detailed illustration of the specific test device software 43.

Specific test device software 43 includes a software layer for operating test device 4 and for visualizing the test sequences and the test results, which layer is denoted by reference numeral 431. A software layer 432 is provided to control the specified test sequences. A first communication layer 434 is used for communication K1 between software layer 432 for controlling the test sequences and test-device-specific measuring devices 41.

An additional second communication layer 435 is used for communication K2 of software layer 432 for controlling the test sequences and control unit 50 in motor vehicle 10, by means of diagnosis software 8 and vehicle communication interface 2.

Diagnosis software 8 in conjunction with vehicle communication interface 8 basically provides all functions of the control unit communication, such as the readout of current status information of control unit 50 (e.g., reading of the error memory; reading of actual values, etc.), the activation of basic functions (e.g., delete error memory, reset service interval, actuator test) as well as the implementation of complex functional sequences (e.g., ABS sensor check, steering angle calibration, brake circuit ventilation, check of high pressure diesel pump, etc.).

However, in the software for controlling test sequences 432, the developers use only the functions of the control unit communication of diagnosis software 8 that are required in the context of the specific test task. This restriction considerably simplifies the operation of test device 4 and requires only minimal further training of the service facility employees.

Figure 3:
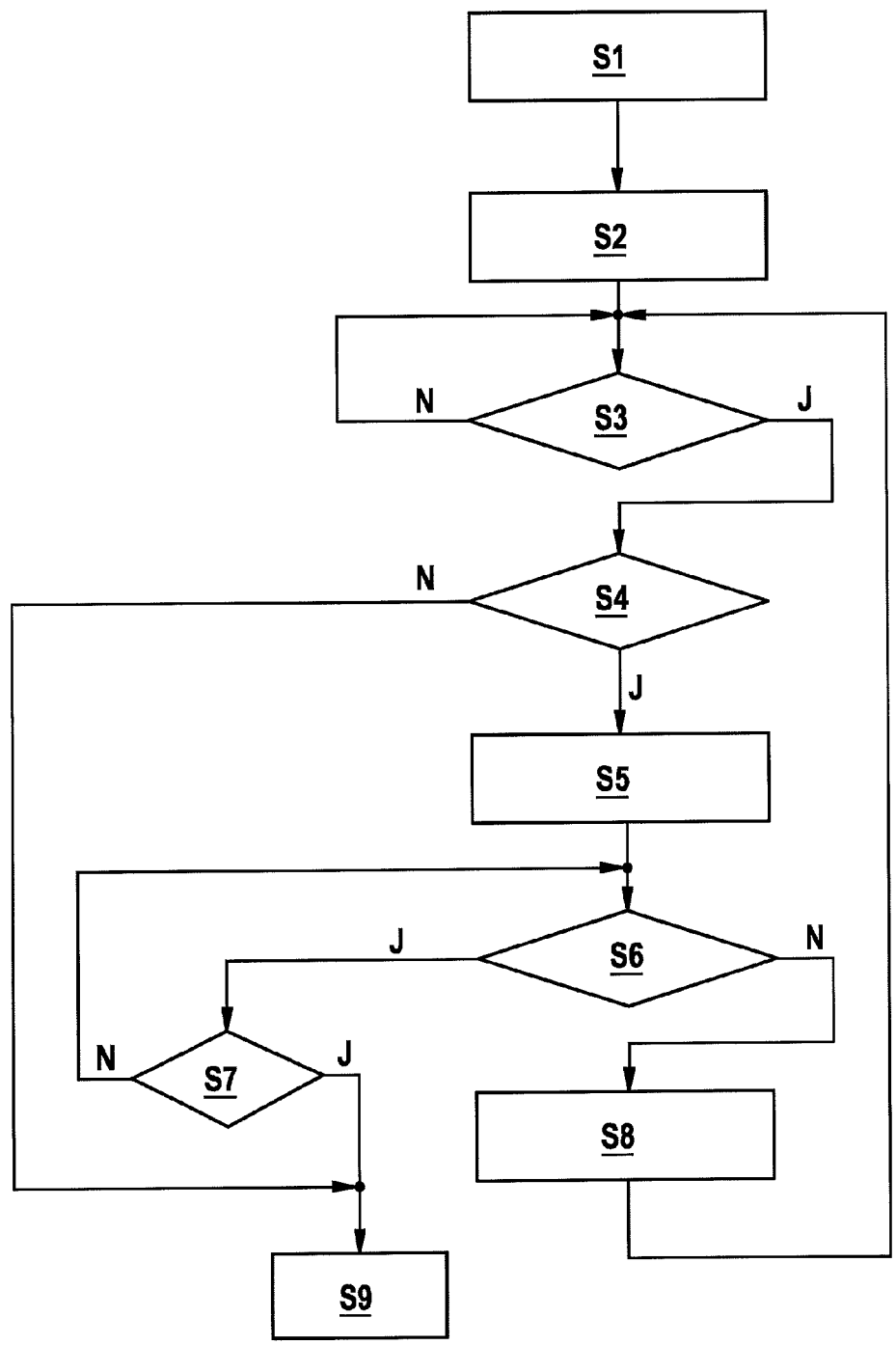
FIG. 3 shows a flow chart to elucidate a motor vehicle test method according to a second specific embodiment of the present invention.

FIG. 3 shows a flow chart to explain a vehicle test method according to a second specific embodiment of the present invention.

In step S1, the technician starts the test sequence.

In step S2, the technician clearly identifies motor vehicle 10 both for the chassis measurement and for the communication with the control unit inside the vehicle; the communication between the software for controlling test sequences 432 on the one hand, and the measuring units for chassis measurement 41 and control unit 50 in vehicle 10, on the other hand, is subsequently established automatically via communication layer 435, diagnosis software 8 and vehicle communication interface 2.

In step S3, i.e., the actual chassis measurement process, the wheel toe of the front wheels for the "steering wheel position straight ahead" state, for example, is determined, then compared to the standard state, e.g., 0° 08' through 0° 16', and displayed, and the agreement with the standard state may be produced by manual adjustments to vehicle 10, if appropriate. This step is carried out iteratively, that is to say, if the chassis measurement has been carried out completely (J), the method switches to step S4; otherwise (N), the chassis measurement and the manual adjustment actions on the vehicle continue, until they have been completed.

In step S4, the measured values for the standard state "steering wheel position straight ahead" are stored in the software for controlling test sequences 432, and this software is utilized to determine the difference between the steering angle measured by control unit 50 in this state with the aid of steering angle sensor 41, and the reference measured value for the "steering angle zero" state stored in control unit 50 for the "steering angle zero" state. If it is detected that the specified limit value has been exceeded (J), the program branches to step S5. If no exceedance is found, branching to step S9—the end of the test method—takes place and the operator is informed of this fact via a corresponding display on display unit 45.

In step S5, the calibration procedure is started by the technician.

In step S6, it is checked whether the standard state is still present. If this is not the case (N), the program branches to step S8 in order to terminate the calibration procedure; this is accompanied by a corresponding display on display unit 45, and the program then branches back to S3. If it is determined in step S6 that the standard state is present (J), the program branches to step S7.

In step S7 it is checked whether the calibration procedure has been concluded. If this is not the case, the method branches back to step S6. If it is determined in step S7 that the calibration procedure is concluded (J), the program branches to step S9. This corresponds to the end of the testing method and the calibration procedure, and is combined with a corresponding display for the operator on display unit 45.

Although the present invention has been described only on the basis of the exemplary embodiment of the chassis measurement in combination with the calibration of the steering angle sensor, it is not restricted to such, but instead is modifiable in many regards. This applies both to the chassis measurement itself and also to any option for integrating the manifold functions of the control unit communication into other vehicle test devices, e.g., brake testing devices, engine testers, exhaust-gas testers, test lanes, climate-control devices, tire service devices etc.

What is claimed is:

1. A motor vehicle test device, comprising:
   a control unit to control a predefined test sequence;
   an operator interface device for the control unit;
   at least one measuring device to measure at least one vehicle parameter;
   a vehicle communication interface, the control unit being configured to communicate with at least one control device of the motor vehicle via the vehicle communication interface; and
   a diagnosis software;
   wherein the control unit is configured to signal at least one predefined test state of the vehicle parameter, and wherein the control unit is configured in such a way that, in response to a signaled test state, the control unit displays a readiness for a communication between the control unit and the control device of the motor vehicle at the operator interface device and makes the communication directly activatable by an operator; and wherein the motor vehicle test device is off-board the motor vehicle and the control device is on-board the motor vehicle.

2. The motor vehicle test device as recited in claim 1, wherein the control unit is configured in such a way that the control unit is able to at least one of: i) read out status information from the control device of the motor vehicle when the communication is activated by the user, or activate simple functions or complex function sequences in the control device of the motor vehicle and implements a calibration procedure in the control device of the motor vehicle.

3. The motor vehicle test device as recited in claim 1, wherein the control unit is configured in such a way that the control unit is able to automatically activate a readiness for a communication between the control unit and the control device of the motor vehicle in response to a signaled vehicle test state.

4. The motor vehicle test device as recited in claim 3, wherein the control unit is configured in such a way that the control unit is able to activate simple functions or complex function sequences in the control device during an automatically activated communication including implementing a calibration procedure in the control device.

5. The motor vehicle test device as recited in claim 4, wherein the measuring device is configured to measure vehicle geometry including at least one of a steering angle and wheel toe.

6. The motor vehicle test device as recited in claim 5, wherein the control device of the motor vehicle is an ESP control device having a steering angle sensor, and the calibration procedure implements a calibration of the steering angle sensor according to the signaled test state.

7. The motor vehicle test device as recited in claim 4, wherein the control unit is configured in such a way that the control unit automatically terminates the calibration in response to a not signaled vehicle testing state.

8. A motor vehicle test method, comprising:
measuring at least one vehicle parameter using a measuring device of a motor vehicle test device, wherein the motor vehicle test device is off-board the motor vehicle;

signaling a predefined test state of the vehicle parameter from the measuring device to a control unit of the motor vehicle test device, wherein the control unit is on-board the motor vehicle; and in response to the signal, displaying a readiness for a communication between the control unit and a control device of the motor vehicle on an operator interface device of the motor vehicle test device, and making the communication directly activatable by an operator.

9. A motor vehicle test method, comprising:
measuring at least one vehicle parameter using a measuring device of a motor vehicle test device, wherein the motor vehicle test device is off-board the motor vehicle;

signaling a predefined test state of the vehicle parameter from the measuring device to a control unit of the motor vehicle test device, wherein the control unit is on-board the motor vehicle; and in response to the signal, automatically activating a communication between the control unit and a control device of the motor vehicle.

10. The motor vehicle test method as recited in claim 9, wherein the control unit is configured so that the control unit is able to activate simple functions or complex function sequences in the control device during an automatically activated communication including implementing a calibration procedure in the control device.

11. The motor vehicle test method as recited in claim 10, wherein the measuring device is configured to measure vehicle geometry including at least one of a steering angle and wheel toe.

12. The motor vehicle test method as recited in claim 11, wherein the control device of the motor vehicle is an ESP control device having a steering angle sensor, and the calibration procedure implements a calibration of the steering angle sensor according to the signaled test state.

13. The motor vehicle test device as recited in claim 10, wherein the control unit is configured so that the control unit automatically terminates the calibration in response to a not signaled vehicle testing state.

* * * * *